Jan. 6, 1948. C. W. SINCLAIR 2,434,180
RIM
Filed May 7, 1945 3 Sheets-Sheet 1
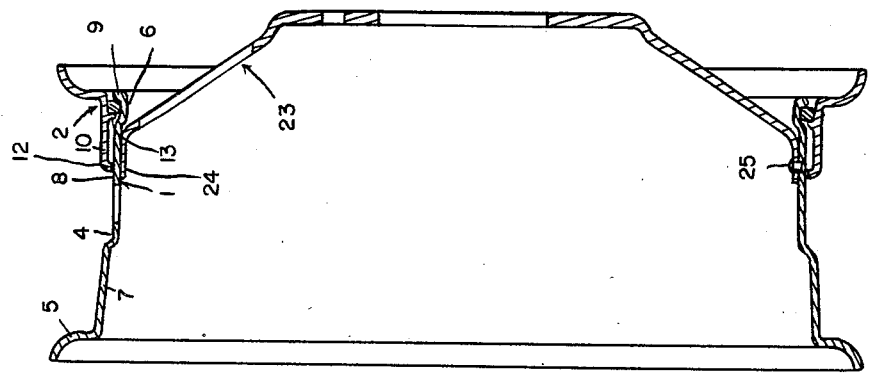
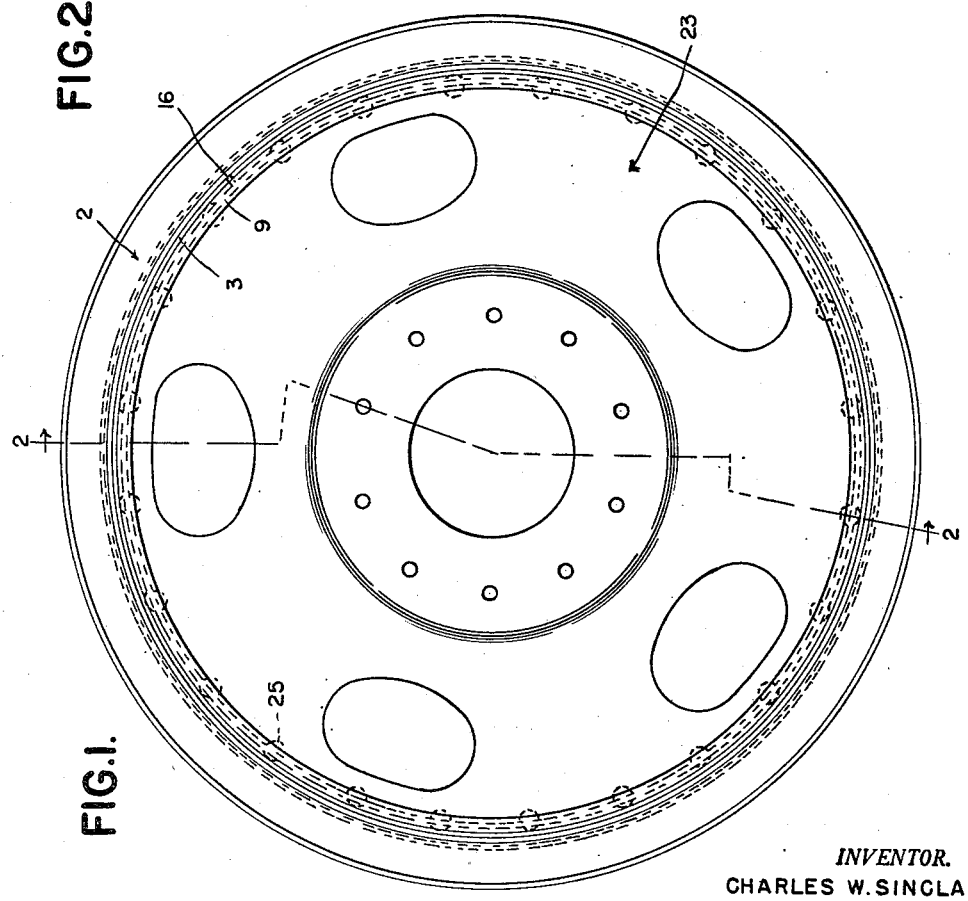
INVENTOR.
CHARLES W. SINCLAIR
BY *Whittemore Hulbert & Belknap*
ATTORNEYS Jan. 6, 1948.     C. W. SINCLAIR     2,434,180
RIM
Filed May 7, 1945     3 Sheets-Sheet 2
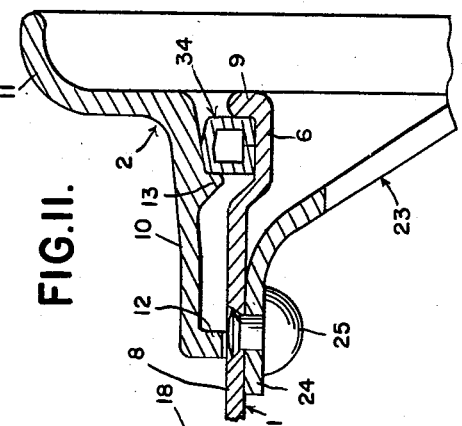
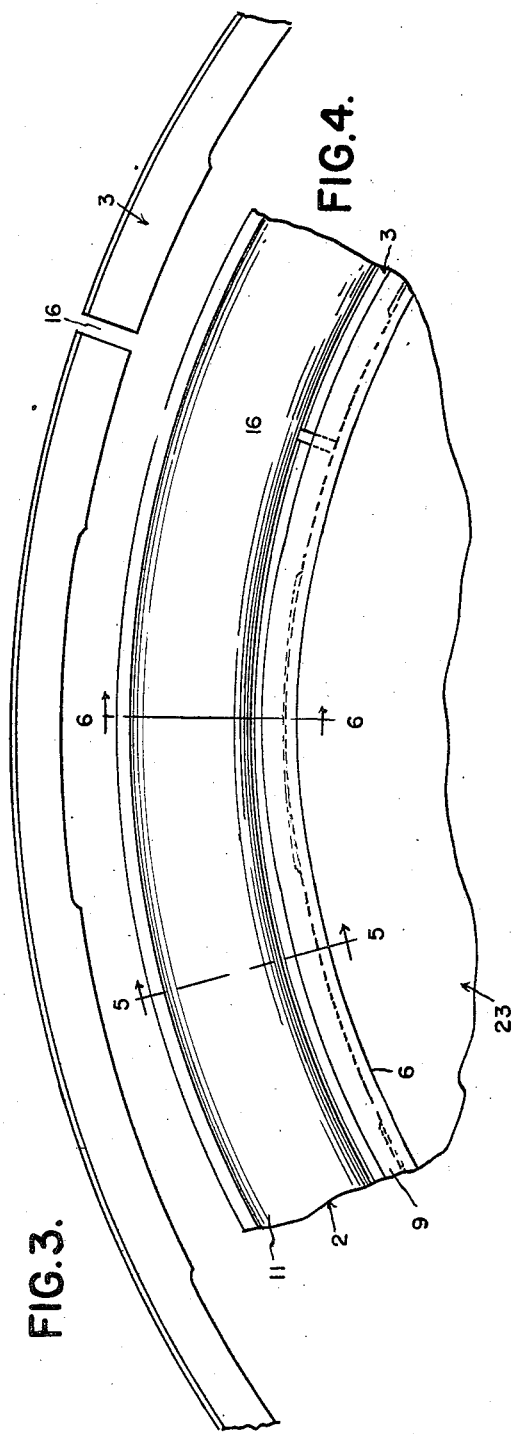
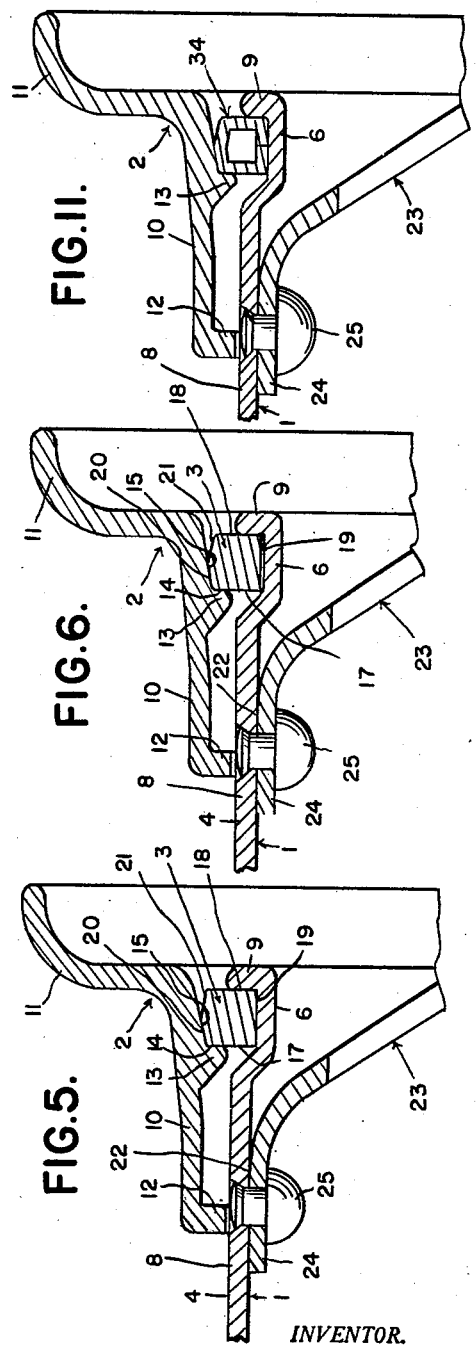
INVENTOR.
CHARLES W. SINCLAIR
BY
*Whittemore Hulbert & Belknap*
ATTORNEYS

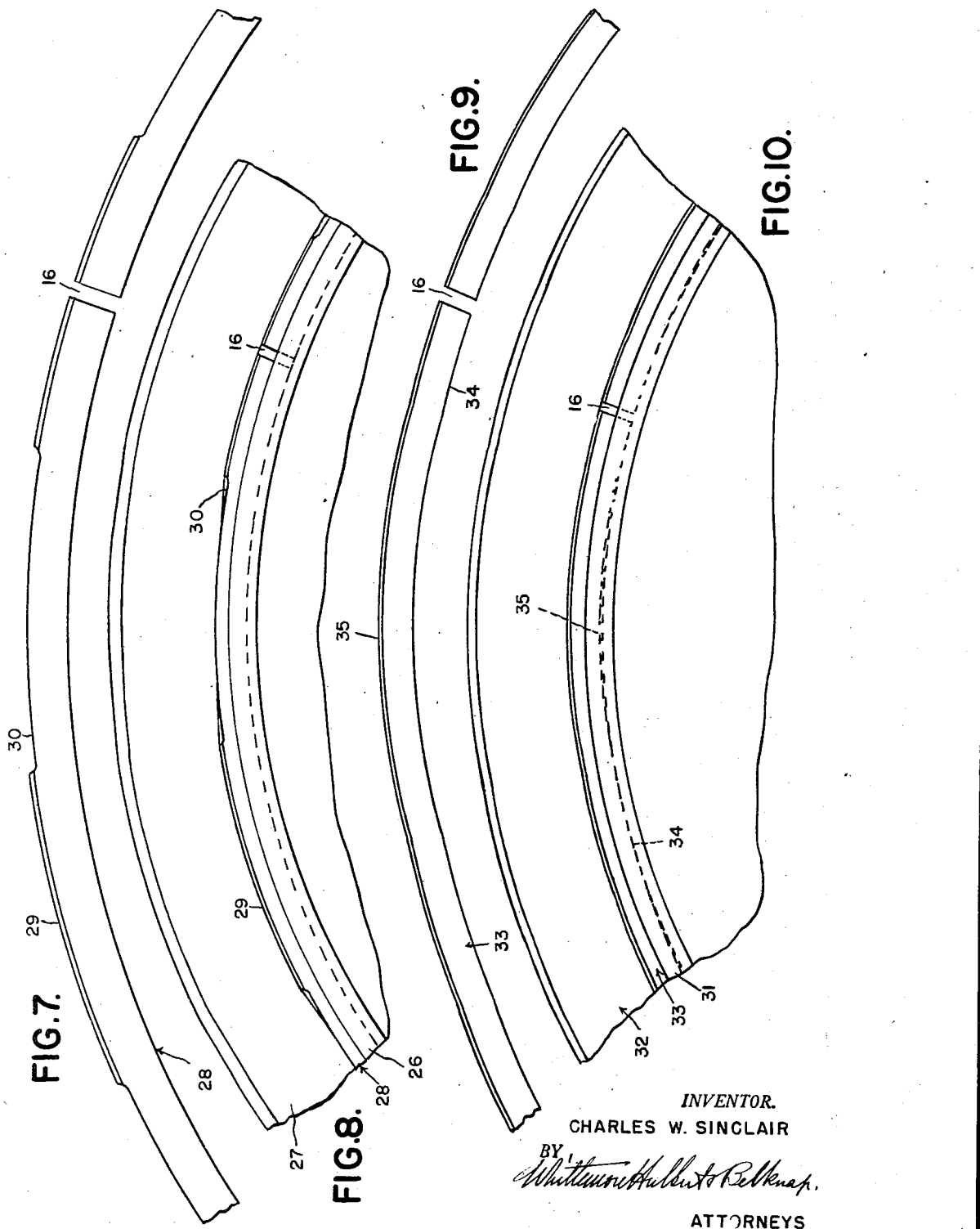

Patented Jan. 6, 1948

2,434,180

UNITED STATES PATENT OFFICE 2,434,180

RIM

Charles W. Sinclair, Detroit, Mich., assignor to Kelsey-Hayes Wheel Company, Detroit, Mich., a corporation of Delaware Application May 7, 1945, Serial No. 592,497

9 Claims. (Cl. 152—410)

The invention relates to rims and refers more particularly to pneumatic tire carrying rims of that type employing a detachable tire retaining ring.

The invention has for one of its objects to provide an improved rim constructed to facilitate mounting and demounting of the tire and to effectively retain the tire when mounted on the rim.

The invention has for other objects to provide an improved rim comprising an endless annular base member, an endless tire retaining ring member and a transversely split clamping ring member between the base member and the tire retaining ring member, one of the members having angularly spaced contacts with an adjacent member to compel flexure of one of the members in a substantially radial direction when the rim parts are assembled; and to provide an improved rim in which the clamping ring member is formed with angularly spaced contact seats and the parts of the rim are so constructed that one, two or all three of the members flex in a substantially radial direction when assembled.

These and other objects of the invention will become apparent from the following description, taken in connection with the accompanying drawings, in which Figure 1 is an elevation of a wheel having a rim embodying the invention;

Figure 2 is a cross section on the line 2—2 of Figure 1;

Figure 3 is an enlarged view of a portion of the clamping ring member of Figures 1 and 2;

Figure 4 is an enlarged view of a portion of Figure 1;

Figures 5 and 6 are cross sections on the lines 5—5 and 6—6, respectively, of Figure 4;

Figures 7 and 8 are views similar to Figures 3 and 4, respectively, and showing a modified construction of rim;

Figures 9 and 10 are views similar to Figures 3 and 4, respectively, and showing another modified construction of rim;

Figure 11 is a cross section similar to Figure 5 showing still another modification of rim.

In general, the rim is a pneumatic tire carrying rim forming part of a motor vehicle wheel. The rim illustrated in Figures 1 to 6, inclusive, comprises the annular base member 1, the detachable tire retaining ring 2, and the detachable clamping ring 3.

The base member 1 is endless and has the annular base 4, the annular tire retaining flange 5 extending generally radially outwardly from one edge of the base and the annular gutter 6 at the other edge of the base. The base is formed with the annular portions 7 and 8 of different diameter with the annular portion 7 of greater diameter and forming a bead seat portion axially inwardly flared toward and connecting into the tire retaining flange. The annular portion 8 extends axially between the annular portion 7 and the gutter 6. The external diameter of the bottom wall of the gutter is less than the external diameter of the annular portion 8 and the axially outer side wall 9 of the gutter has an external diameter which is preferably slightly less than the external diameter of the annular portion 8.

The tire retaining ring 2 is endless and has the axially outwardly flared tire bead seat portion 10, the integral tire retaining flange portion 11 extending generally radially outwardly from the axially outer edge of the tire bead seat portion, and the integral generally radially inwardly extending parts 12 and 13 with the former located at the axially inner edge of the tire bead seat portion and the latter located near the axially outer edge of the tire bead seat portion and presenting a radially extending shoulder 14. The tire retaining ring also has the radially inner surface 15 which flares axially outwardly from its junction with the shoulder 14. The parts 12 and 13 have internal diameters slightly greater than the external diameter of the annular portion 8 of the base and the part 12 telescopes over or encircles the annular portion while the part 13 is located axially outwardly of the annular portion when the tire retaining ring is in operative position on the base.

The clamping ring 3 is transversely split at one point 16 and has a section with radially extending axially inner and outer surfaces 17 and 18, an axially extending radially inner surface 19 and flared radially outer surfaces 20 and 21 which are inclined radially outwardly toward each other from the axially inner and outer surfaces. The construction is such that the clamping ring is symmetrically arranged with respect to its axially central radial plane so that the clamping ring is reversible. The clamping ring has angularly spaced contacts with the base and, more particularly, has its radially inner surface 19 formed with alternate circumferentially extending contact seats and recesses with the recesses sufficiently long to provide for flexing of the base into the recesses or flexing of the clamping ring at the recesses, or flexing of both the base and clamping ring. In this connection, it is apparent that the flexing action is dependent upon the relative strengths of the base and clamping ring and their resistance to flexing in radial directions. The contact seats are of substantially the same radius and the difference in radii of the contact seats and the radially outer contact surface of the clamping ring 3 is greater than the radial dimension between the bottom wall of the gutter 6 and the radially inner surface 15 of the tire retaining ring 2 so that when the tire retaining ring and the clamping ring are in operative position relative to the base, the tire retaining ring being of greater strength than the clamping ring and base compels flexure of either or both the clamping ring and base. In the modification as shown particularly in Figure 4, the parts are so constructed that the flexing takes place mainly in the base and to a relatively small degree in the clamping ring, the flexing in the base being axially outwardly of its zone of connection at 22 with the wheel body 23 which, as illustrated, is a tapered disc having an axially extending flange 24 secured to the rim by suitable means, such as the rivets 25.

With the construction of rim as thus far described, the tire may be readily and easily mounted on the rim, during which time the tire retaining ring 2 and the clamping ring 3 are removed. It will be noted that the annular bead seat portion 7 of the rim base 4 may be tightly fitted by the radially inner face of the axially inner bead of the tire casing to thereby eliminate rocking of the axially inner tire bead on the tire bead seat portion. The tire retaining ring may then be readily mounted on the base and inserted within the axially outer bead of the tire casing, the construction being such that the radially inner face of this bead may also tightly fit the last mentioned tire bead seat portion. While the tire retaining ring is in an axially inner position to clear the clamping ring, the latter may be inserted into the gutter with the surface 18 engaging the gutter side wall 9, after which the tire retaining ring may be moved to its axially outer position over the clamping ring by inflation of the inner tube of the tire. During the axially outward movement of the tire retaining ring, it maintains its dimensions and acts through the clamping ring to compel radial flexure mainly of the rim base, including the gutter, the axial pressure exerted by the tire being partially converted into radial pressure exerted by the clamping ring. As illustrated, the angle of the contacting surfaces of the tire retaining ring and the clamping ring is approximately 12 degrees so that the radial component of pressure is much greater than the axial component. The axially outward movement of the tire retaining ring continues until the shoulder 14 engages the surface 17, at which time the clamping ring definitely positions the tire retaining ring axially relative to the base. At this time, the base is flexed radially inwardly by the angularly spaced contact seats of the clamping ring and bulges into the recesses of the clamping ring between the contact seats, as shown particularly in Figure 4, there being a solid connection, in effect, between the base, the clamping ring at the contact seats, and the tire retaining ring. Since the axial pressure exerted by the tire is partially converted into radial pressure, the rim can easily retain the tire and be of relatively light weight.

Figures 7 and 8 illustrate a modification of wheel in which the endless annular base member 26 is constructed in the same manner as the endless annular base member 1. Also the endless tire retaining ring 27 is constructed in the same general manner as the endless tire retaining ring 2, but is of lighter construction. However, the transversely split clamping ring 28 is of different construction than the transversely split clamping ring 3 in that the radially outer face is formed with the alternate circumferentially extending contact seats 29 and recesses 30 with the recesses sufficiently long to enable the tire retaining ring to flex into the recesses while the inner tube of the tire is being inflated and the tire retaining ring is being axially moved to its operative position upon the clamping ring.

In the modification illustrated in Figures 9 and 10, the endless annular base member 31 and the endless tire retaining ring 32 are of the same general construction as the endless annular base member 26 and the endless tire retaining ring 2. The transversely split clamping ring 33 has angularly spaced contacts with both the base and the tire retaining ring and these contacts alternate. More particularly, the clamping ring is circumferentially wavy and has on its radially inner and outer faces the angularly spaced contact seats 34 and 35, respectively, with the contact seats on one face alternating with the contact seats on the other face. The contact faces 34 have substantially the same radius and the contact faces 35 also have substantially the same radius and the difference in radii is greater than the normal radial distance between the portions of the base and tire retaining ring engaged by the clamping ring so that while the parts are being moved to their operative position the clamping ring is flexed, the base and the tire retaining ring being more strongly resistant to radial flexure.

Figure 11 discloses a transversely split clamping ring 34 which may have the peripheral contour of any one of the previously mentioned clamping rings. This clamping ring is made tubular to be of lighter weight and the gauge of the stock forming the clamping ring may be such that the clamping ring is more strongly resistant to radial flexure than either the rim base or the tire retaining rim, or, if desired, the rim base and tire retaining ring may be more strongly resistant to radial flexure than the clamping ring.

What I claim as my invention is:

1. In a tire carrying rim, an endless annular base member having an annular gutter, a detachable transversely split clamping ring member extending within said gutter and a detachable endless tire retaining ring member encircling and seated on said clamping ring member, said clamping ring member having angularly spaced contacts with one of said other members and also having radial wedging engagement with one of said other members and one of said members being flexed in the operative position of said members.

2. In a tire carrying rim, an endless annular base member provided with a substantially radial surface, a detachable endless tire retaining ring member encircling said base member and having a portion for engaging the laterally outer side of a tire and a clamping ring member abutting said substantially radial surface and provided with radially inner and outer surfaces with one of said surfaces having angularly spaced contact seats, said base member and tire retaining ring member being provided with surfaces for cooperatively engaging said radially inner and outer surfaces respectively, certain of said cooperatively engaging surfaces being inclined laterally and radially outwardly to the axis of the rim whereby said clamping ring member converts the pressure exerted by the tire in an axial direction into pressure exerted against said first mentioned members in a radial direction.

3. In a tire carrying rim, an endless annular base member provided with an annular wall presenting a substantially radial surface, a detachable endless tire retaining ring member encircling said base member and having a portion for engaging the laterally outer side of a tire and a generally radially inwardly extending part presenting a substantially radial shoulder and a transversely split clamping ring member between said base member and tire retaining ring member and abutting said surface and shoulder, said clamping ring member being provided with radially inner and outer surfaces with one of said surfaces having angularly spaced contact seats, said base member and tire retaining ring member being provided with surfaces for cooperatively engaging said radially inner and outer surfaces respectively, certain of said cooperatively engaging surfaces being inclined laterally and radially outwardly to the axis of the rim whereby said clamping ring member converts the pressure exerted by the tire in an axial direction into pressure exerted against said first mentioned members in a radial direction.

4. In a tire carrying rim, an endless annular base member provided with a substantially radial surface, a detachable endless tire retaining ring member encircling said base member and having a portion for engaging the laterally outer side of a tire and a clamping ring member abutting said radial surface and provided with radially inner and outer surfaces each having angularly spaced contact seats, said base member and tire retaining ring member being provided with surfaces for cooperatively engaging said radially inner and outer surfaces respectively, certain of said cooperatively engaging surfaces being inclined laterally and radially outwardly to the axis of the rim whereby said clamping ring member converts the pressure exerted by the tire in an axial direction into pressure exerted against said first mentioned members in a radial direction.

5. In a tire carrying rim, an endless annular base member provided with a substantially radial surface, a detachable endless tire retaining ring member encircling said base member and having a portion for engaging the laterally outer side of a tire and a circumferentially wavy clamping ring member abutting said surface and having angularly spaced contact seats on its radially inner and outer surfaces with the contact seats on the radially outer surface alternating with the contact seats on the radially inner surface, said base member and tire retaining ring member being provided with surfaces for cooperatively engaging said radially inner and outer surfaces respectively, certain of said cooperatively engaging surfaces being inclined laterally and radially outwardly to the axis of the rim whereby said clamping ring member converts the pressure exerted by the tire in an axial direction into pressure exerted against said first mentioned members in a radial direction.

6. In a tire carrying rim, an endless annular base member provided with a substantially radial surface, a detachable endless tire retaining ring member encircling said base member and having a portion for engaging the laterally outer side of a tire and a detachable transversely split clamping ring member abutting said substantially radial surface and provided with radially inner and outer surfaces with the inner surface having alternate circumferentially extending contact seats and recesses, said base member and tire retaining ring member being provided with surfaces for cooperatively engaging said radially inner and outer surfaces respectively, certain of said cooperatively engaging surfaces being inclined laterally and radially outwardly to the axis of the rim whereby said clamping ring member converts the pressure exerted by the tire in an axial direction into pressure exerted against said first mentioned members in a radial direction.

7. In a tire carrying rim, an endless annular base member provided with a substantially radial surface, a detachable endless tire retaining ring member encircling said base member and having a portion for engaging the laterally outer side of a tire and a detachable transversely split clamping ring member abutting said substantially radial surface and provided with a radially outer contacting surface in wedging engagement with said tire retaining ring member and with a radially inner surface having angularly spaced contacts in engagement with said base member, said clamping ring member converting pressure exerted by the tire in an axial direction into pressure exerted against said other members in a radial direction.

8. In a tire carrying rim, an endless annular base member provided with a substantially radial surface, a detachable endless tire retaining ring member encircling said base member and having a portion for engaging the laterally outer side of a tire and a clamping ring member abutting said substantially radial surface and provided with radially inner and outer surfaces with said radially outer surface having alternate circumferentially extending contact seats and recesses, said base member and tire retaining ring member being provided with surfaces for cooperatively engaging said laterally inner and outer surfaces respectively, certain of said cooperatively engaging surfaces being inclined laterally and radially outwardly to the axis of the rim whereby said clamping ring member converts the pressure exerted by the tire in an axial direction into pressure exerted against said first mentioned members in a radial direction.

9. In a tire carrying rim, an endless annular base member having an annular gutter provided with an annular wall presenting a substantially radial surface, a detachable endless tire retaining ring member encircling said base member and having a portion for engaging the laterally outer side of a tire, a generally radially inwardly extending part presenting a substantially radial shoulder and a radially inner surface axially outwardly of said part and a clamping ring member extending within said gutter and abutting said substantially radial surface and said shoulder, said clamping ring member having radially inner and outer surfaces respectively engaging the bottom of said gutter and said radially inner surface of said tire retaining ring member and one of said radially inner and outer surfaces of said clamping ring member having angularly spaced contacts with one of said base and tire retaining ring members, the radial dimensions between said radially inner and outer surfaces of said clamping ring member being greater than the normal radial distances between the bottom of said gutter and said radially inner surface of said clamping ring member whereby one of said base, clamping ring and tire retaining ring members is stressed radially in the operative position of said members.

CHARLES W. SINCLAIR.

REFERENCES CITED

The following references are of record in the file of this patent:

UNITED STATES PATENTS

| Number | Name | Date |
|---|---|---|
| 973,162 | Bryant | Oct. 18, 1910 |
| 853,058 | Bryant | May 7, 1907 |
| 922,597 | Kintz | May 25, 1909 |

FOREIGN PATENTS

| Number | Country | Date |
|---|---|---|
| 627,235 | Germany | 1936 |